Nov. 22, 1949  H. Y. LAW  2,489,039
CHAIN AND SPROCKET ASSEMBLY
Filed June 14, 1948  2 Sheets-Sheet 2
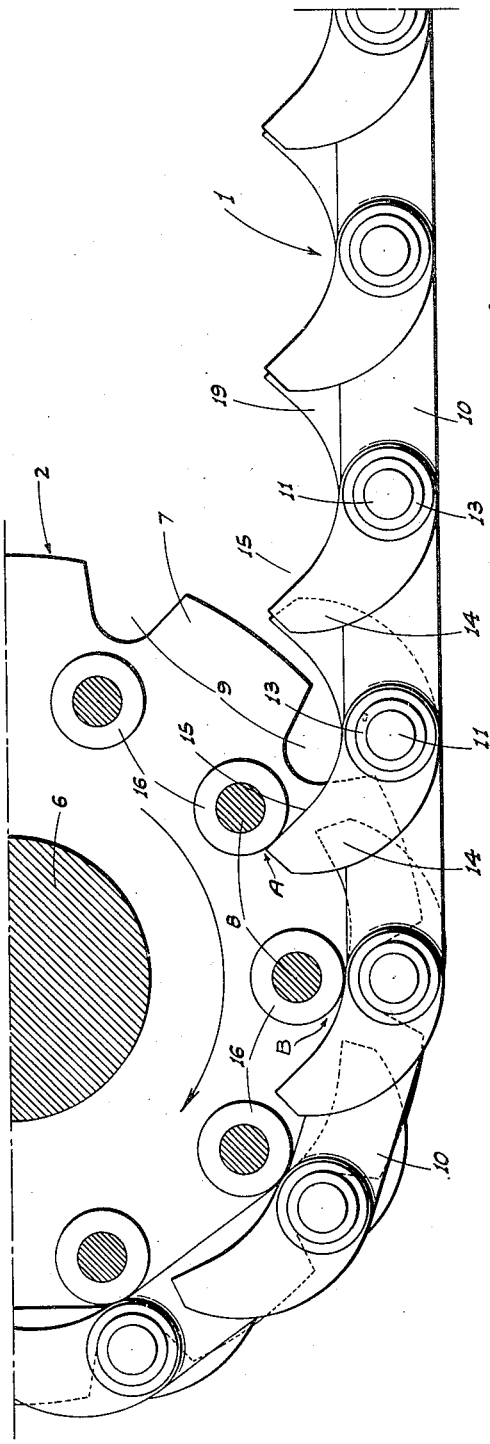
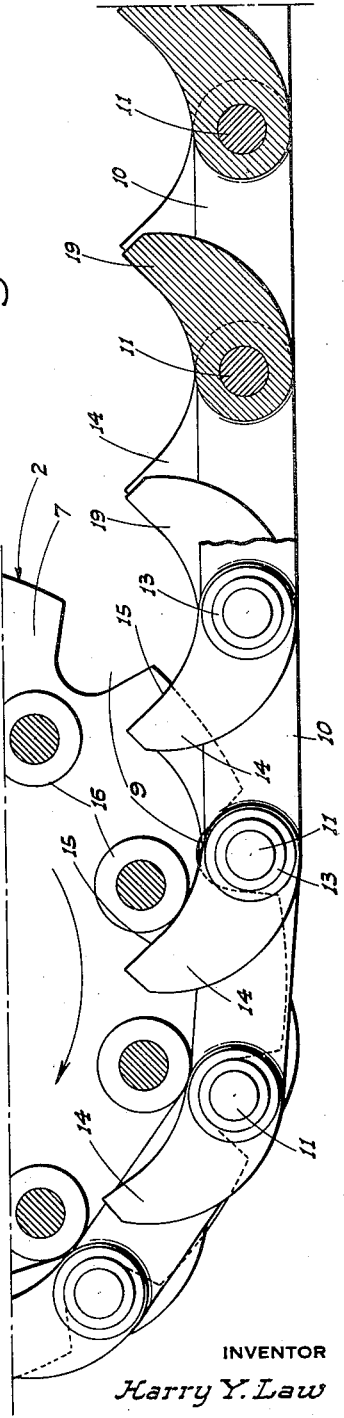
INVENTOR
Harry Y. Law
BY
ATTORNEYS Patented Nov. 22, 1949

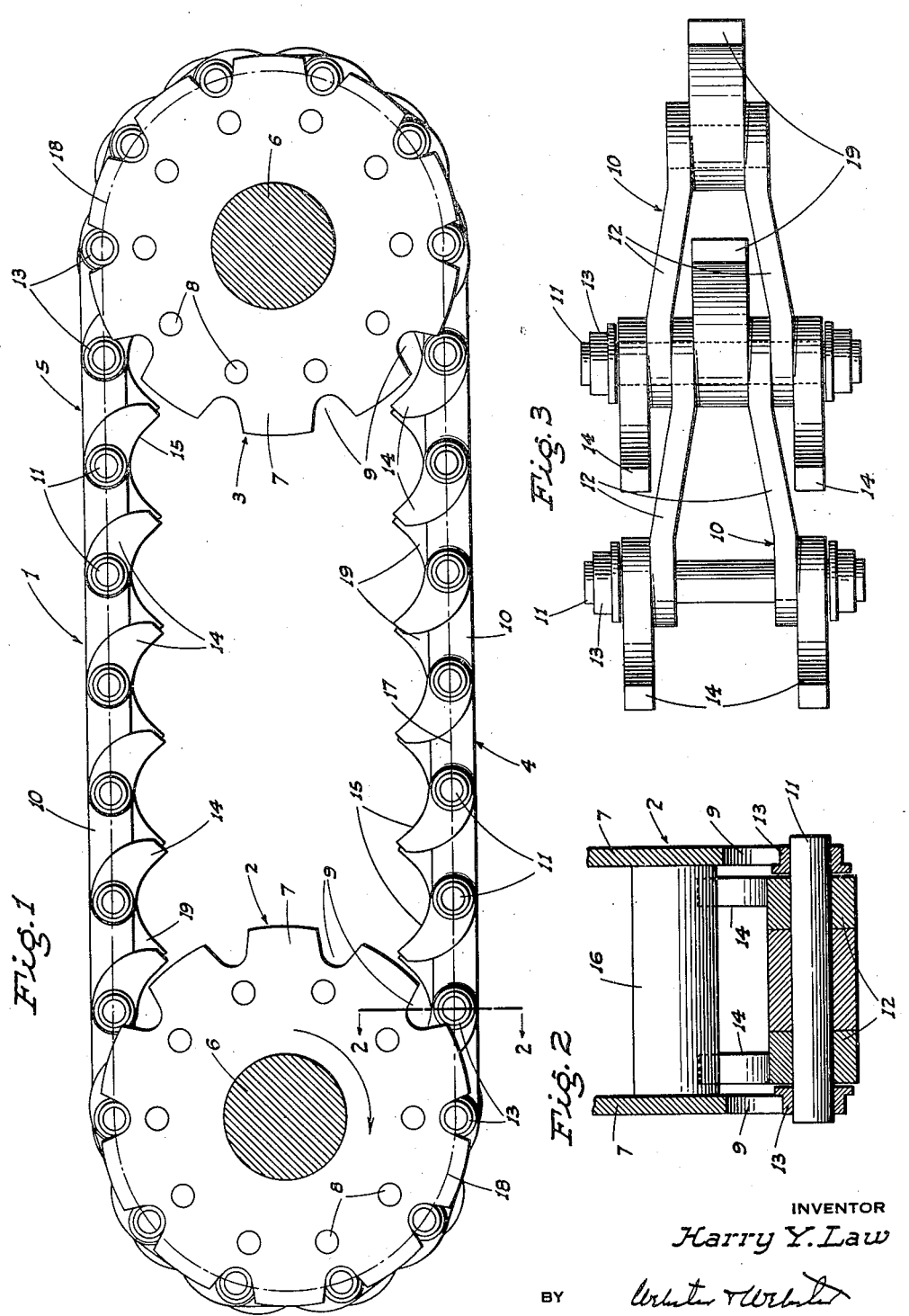

2,489,039

UNITED STATES PATENT OFFICE 2,489,039

CHAIN AND SPROCKET ASSEMBLY

Harry Y. Law, Merced, Calif.

Application June 14, 1948, Serial No. 32,770

7 Claims. (Cl. 74—245)

1

This invention is directed to, and it is an object to provide, a novel chain and sprocket assembly.

Another object of the invention is to provide a chain and sprocket assembly which is constructed in a manner so that the runs of the chain approach each receiving sprocket in straight-line relation, and maintain such relationship until fully engaged with such sprocket.

In other words, the purpose of the invention is to assure that the pitch line of each run of the chain is straight until it becomes tangent to the pitch line of the chain receiving sprocket.

An additional object of the invention is to provide a chain and sprocket assembly wherein the chain runs smoothly and evenly, and without the flutter usually attendant endless chains wherein the pitch lines of the runs recurringly fluctuate, with respect to the pitch line of the receiving sprockets, as the links travel into mesh with the tooth spaces of said sprockets.

A further object of the invention is to provide a chain and sprocket assembly, as above, wherein the desired result is attained by the employment, on the chain, of novel cam fingers secured to the chain links and cooperating with corresponding rollers on the sprockets as the links approach and mesh with the same.

A further object of the invention is to provide a reliable chain and sprocket assembly, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of a chain and sprocket assembly embodying the invention.

Fig. 2 is an enlarged cross section on line 2—2 of Fig. 1.

Fig. 3 is an enlarged, fragmentary plan view of the chain.

Fig. 4 is an enlarged fragmentary elevation of the assembly, illustrating one run of the chain traveling onto the receiving sprocket.

Fig. 5 is a similar view, but illustrates an advanced position of the same links and cam fingers relative to the sprocket.

Referring now more particularly to the characters of reference on the drawings, the chain and sprocket assembly comprises an endless chain, indicated generally at 1, trained at its ends over sprockets, indicated generally at 2 and 3.

The endless chain 1 includes a lower run 4 and an upper run 5; the sprocket 2 being the receiving sprocket for the lower run 4, while the sprocket 3 is the receiving sprocket for the upper run 5 upon rotation in the direction indicated by the arrow in Fig. 1.

The sprockets 2 and 3 are of lantern type and are each mounted on a cross shaft 6.

The sprockets 2 and 3 are of identical construction, and each includes matching, axially spaced sprocket discs 7 secured together by a concentric circumferential row of cross pins 8, which cross pins 8 are disposed directly radially inwardly from the tooth spaces 9 of said sprockets.

The endless chain 1 is made up of a plurality of links, each indicated at 10, and each comprising the following:

A transverse link pin 11 extends, in journaled relation, through one end of a pair of transversely spaced, longitudinally extending link bars 12; there being spools 13 on opposite ends of each transverse link pin 11 for the retention of the parts on said pin, and for the further purpose of meshing in the tooth spaces 9 as the chain 1 traverses the sprockets. Each pair of link bars 12 converges, in a longitudinal direction, from the link pin 11 of the corresponding link toward and then into journaled connection with the link pin of the next link.

The above arrangement provides links 10 pivotally connected together in end to end relation for travel between and about the sprockets.

The links 10 include the following additional elements:

The divergent ends of the link bars 12 of each link 10 are fitted on the outside thereof, i. e. between said bars and the spools 13, with arcuate cam fingers 14; said cam fingers being fixed to the link bars 12 and extending inwardly from the chain 1 at a forward incline with respect to the corresponding receiving sprocket 2 or 3.

The inner or working longitudinal edges 15 of each pair of arcuate cam fingers 14 are alined transversely of the chain, and provide arcuate cams of predetermined longitudinal extent and radii.

As the runs 4 and 5 of the chain 1 approach and mesh with the corresponding receiving sprockets 2 and 3, respectively, the arcuate cam fingers 14 are engaged by transversely elongated rollers 16 on the cross pins 8 between the sprocket discs 7; said rollers riding the cam edges 15 of said cam fingers 14 to maintain the pitch line 17 of said runs perfectly straight until such pitch lines become tangent to the pitch line 18 of the receiving sprocket. At this point the spools 13 have fully seated in the corresponding tooth spaces 9.

This action is well illustrated in Figs. 4 and 5, which represent the meshing of the lower run 4 with the receiving sprocket 2.

In these figures it will be noted that as each pin-supported roller 16 approaches, but is short of, dead-center of the sprocket, such roller begins to ride the outer end portion of the cam edges 15 of a then adjacent and corresponding pair of the cam fingers 14. The diameter of the rollers 16, together with the predetermined extent and radius of the cam edges 15, is such that as the sprocket continues to rotate, with resultant lowering of said roller 16, the chain is held exactly on its pitch line until the corresponding spools 13 are in full mesh in the related tooth spaces 9 of the receiving sprocket at dead-center thereof.

It will therefore be evident that as each run of the chain travels into mesh with its corresponding receiving socket, said run will remain perfectly straight until full mesh with the sprocket is attained. This is very desirable as it permits the endless chain to travel smoothly and freely, without undesirable flutter and attendant wear and tear.

Additionally, in certain adaptations of the chain and sprocket assembly, as for example in the track of an endless track-type tractor, the straight line action of the runs is very desirable and beneficial.

The chain and sprocket as described above is an embodiment of the invention wherein the direction of rotation is one way. However, in those cases where the chain is to be reversely driven then link bars 12 are fitted therebetween, in fixed relation and at their convergent end, with other arcuate cam fingers 19. These single cam fingers 19 are of exactly the same shape and purpose as the cam fingers 14, but extend in reverse order or direction with respect to the latter. Consequently, upon reverse rotation of the chain 1, the single cam fingers 19 of the links 10 act in cooperation with the rollers 16 to produce exactly the same result as do the cam fingers 14 upon rotation in the other direction. In other words, with reverse travel of the endless chain 1, the single arcuate cam fingers 19 of the links 10 cooperate with the rollers 16 to maintain the pitch line 17 of the runs perfectly straight until tangent with the pitch line 18 of the receiving sprocket.

The above described chain and sprocket assembly provides a simple but practical and reliable structure for the accomplishment of the intended purpose.

It will be understood that each cam face 15 is developed or generated with relation to rollers 16 and their movement between the initial cam engaging position A and the final position B (see Fig. 4) so that the rollers remain constantly engaged with each cam face in turn and while so doing, maintain the pitch line of the chain exactly straight and tangent to the pitch line of the sprocket.

This generation of the cam surface results in the outer end portion thereof being straight and at an angle of 46 degrees to the pitch line of the chain (with a ten roller sprocket); the straight portion being followed by a curved portion to the inner end of the cam face.

It should also be noted that elements 13 may be pressed-on spools rather than rollers if desired.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An endless chain and sprocket assembly including a receiving sprocket, a chain having a run adapted to travel toward and mesh with the receiving sprocket, said chain including links pivotally connected together at adjacent ends by cross pins, spools on the outer ends of the cross pins, the receiving sprocket including spaced sprocket discs having alined tooth spaces adapted to receive said spools when the chain meshes with the sprocket, and members on the chain links and sprocket adapted to cooperatively engage and maintain the pitch line of said run straight until the point of tangency with the pitch line of said sprocket is reached, at which point the spools on the cross pins are in full mesh with corresponding tooth spaces of the sprocket.

2. An endless chain and sprocket assembly including a receiving sprocket, a chain having a run adapted to travel toward and mesh with the receiving sprocket, said chain including links pivotally connected together at adjacent ends by cross pins, spools on the outer ends of the cross pins, the receiving sprocket including spaced sprocket discs having alined tooth spaces adapted to receive said spools when the chain meshes with the sprocket, and members on the chain links and sprocket adapted to cooperatively engage and maintain the pitch line of said run straight until the point of tangency with the pitch line of said sprocket is reached, at which point the spools on the cross pins are in full mesh with corresponding tooth spaces of the sprocket; said members including cam fingers fixed on and projecting inward from the links, and other rollers mounted on the sprocket in a circumferential row.

3. An endless chain and sprocket assembly including a receiving sprocket, a chain having a run adapted to travel toward and mesh with the receiving sprocket, said chain including links pivotally connected together at adjacent ends by cross pins, spools on the outer ends of the cross pins, the receiving sprocket including spaced sprocket discs having alined tooth spaces adapted to receive said spools when the chain meshes with the sprocket, and members on the chain links and sprocket adapted to cooperatively engage and maintain the pitch line of said run straight until the point of tangency with the pitch line of said sprocket is reached, at which point the spools on the cross pins are in full mesh with corresponding tooth spaces of the sprocket; said members including cam fingers fixed on and projecting inward from the links, and other rollers mounted on the sprocket in a circumferential row, said other rollers being disposed between the sprocket discs adjacent but radially inwardly of the tooth spaces.

4. An endless chain and sprocket assembly including a receiving sprocket, a chain having a run adapted to travel toward and mesh with the receiving sprocket, said chain including links pivotally connected together at adjacent ends by cross pins, spools on the outer ends of the cross pins, the receiving sprocket including spaced sprocket discs having alined tooth spaces adapted to receive said spools when the chain meshes with the sprocket, and members on the chain links and sprocket adapted to cooperatively engage and maintain the pitch line of said run straight until the point of tangency with the pitch line of said sprocket is reached, at which point the spools on the cross pins are in full mesh with corresponding tooth spaces of the sprocket; said members including cam fingers fixed on and projecting inward from the links, and other rollers mounted on the sprocket in a circumferential row, the cam fingers having arcuate cam edges facing inward and inclined in the direction of travel.

5. An endless chain and sprocket assembly including a receiving sprocket, a chain having a run adapted to travel toward and mesh with the receiving sprocket, said chain including links pivotally connected together at adjacent ends by cross pins, spools on the outer ends of the cross pins, the receiving sprocket including spaced sprocket discs having alined tooth spaces adapted to receive said spools when the chain meshes with the sprocket, a cam finger on each link projecting inwardly and having an arcuate forwardly inclined cam edge facing inward, and a circumferential row of other rollers in the sprocket between the disc with corresponding ones of said other rollers adjacent and radially alined with the tooth spaces; the cam edges of said cam fingers and corresponding rollers of the row cooperatively engaging, as the run closely approaches and meshes with the sprocket, whereby to maintain the pitch line of the run straight to the point of tangency with the pitch line of said sprocket.

6. An endless chain and sprocket assembly including a receiving sprocket, a chain having a run adapted to travel toward and mesh with the receiving sprocket, said chain including links pivotally connected together at adjacent ends by cross pins, spools on the outer ends of the cross pins, the receiving sprocket including spaced sprocket discs having alined tooth spaces adapted to receive said spools when the chain meshes with the sprocket, a pair of transversely spaced cam fingers fixed on each link and projecting inward therefrom, each pair of cam fingers having alined, arcuate and forwardly inclined cam edges facing inward, and a circumferential row of other rollers in the sprocket between the disc with corresponding ones of said other rollers adjacent and radially alined with the tooth spaces; the cam edges of said pairs of cam fingers and corresponding rollers of the row cooperatively engaging, as the run closely approaches and meshes with the spindle, whereby to maintain the pitch line of the run straight to the point of tangency with the pitch line of said sprocket.

7. A chain and sprocket assembly including a sprocket which comprises transversely spaced apart discs having sets of alined tooth spaces in the peripheries thereof, a roller disposed between the disc radially inward of each set of tooth spaces, a chain comprising links pivoted together for relative articulated movement, means adjacent each pivot point of the links for driving engagement with the tooth spaces of the sprockets, each link having a cam projecting from one end thereof in the direction of travel of the chain and inwardly of the inner face of the chain, such cams being engageable by the rollers, the cam surfaces being so generated relative to the rollers that engagement of the cams by the rollers will maintain the chain links in a straight line tangent to the pitch circle of the sprocket until the point of tangency is reached by the link pivots.

HARRY Y. LAW.

REFERENCES CITED

The following references are of record in the file of this patent:

UNITED STATES PATENTS

| Number | Name | Date |
|---|---|---|
| 588,064 | Hewett | Aug. 10, 1897 |
| 2,199,292 | Pierce | Apr. 30, 1940 |